Oct. 9, 1945.   J. T. ARMBRUST   2,386,418
THREE DIMENSIONAL PICTURE
Filed April 22, 1942
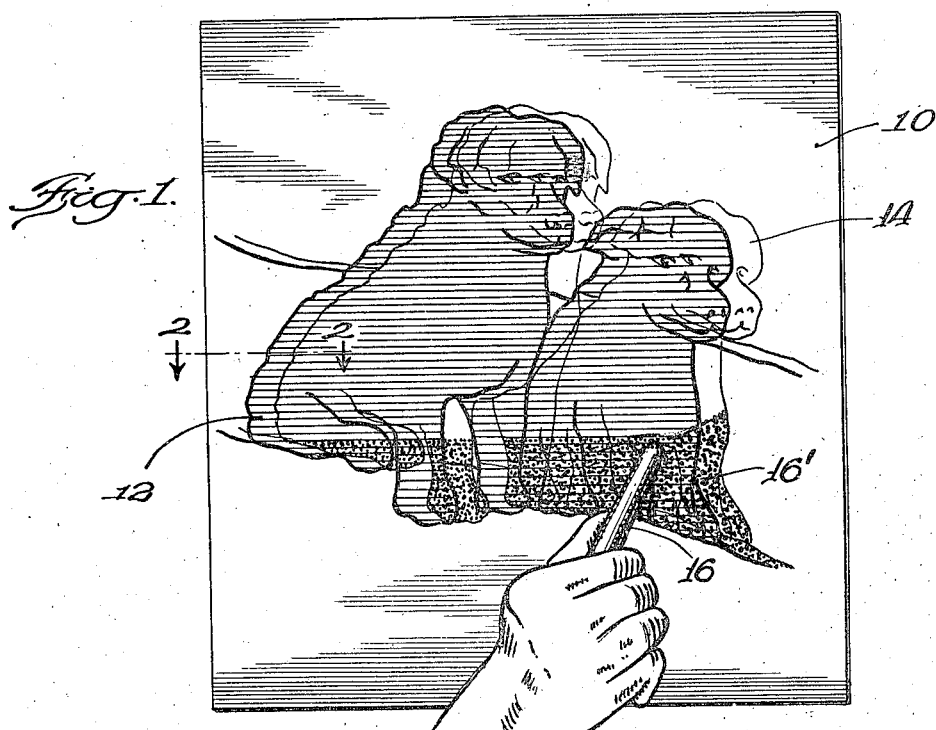
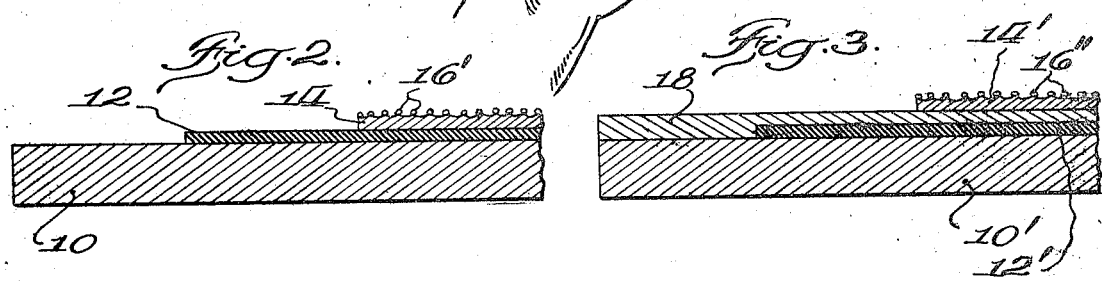

Patented Oct. 9, 1945

2,386,418

UNITED STATES PATENT OFFICE 2,386,418

THREE-DIMENSIONAL PICTURE

John T. Armbrust, Chicago, Ill.

Application April 22, 1942, Serial No. 440,005

8 Claims. (Cl. 35—26)

My invention pertains to three dimensional pictures and is more particularly concerned with an improved method and means for producing these pictures.

It is common to produce three dimensional pictures by printing a first view of a subject in a color such as blue and superimposing upon the blue picture a second view of the same subject printed in a different color such as red. The views so printed are usually based on simultaneously produced photographs made by a double camera having lenses spaced apart approximately the distance between the eyes of a normal person and in order to get the illusion of depth the superimposed colored views are observed through spectacles having a blue lens and a red lens.

An object of my invention is to provide a method and means whereby such pictures will be made more attractive to children by permitting them to participate in the forming of the superimposed colored views.

Another object of my invention is to provide a novel method and means of producing such three dimensional pictures and which will be of educational value and adapted for use in schools and similar institutions.

Another object of my invention is to provide a simple and inexpensive method and means whereby a child may participate in the completion of such a three dimensional picture.

Other objects and advantages will become apparent as the description proceeds.

In the drawing:

Fig. 1 is an illustration of a sheet of paper to which superimposed differently colored views have been applied according to my invention;

Fig. 2 is a fragmentary vertical section taken on the line 2—2 of Fig. 1; and

Fig. 3 is a view similar to Fig. 2 but showing a modification.

In Fig. 1 I have illustrated a sheet of paper or other suitable material 10 upon which have been printed two superimposed views of the same subject. The first view 12 is printed in one color such, for example, as blue and the superimposed view 14 is originally printed in a colorless material. The second view is so printed that a child may color it red as by means of a red crayon 16, so that it will contrast with the blue view 12. The two views will not correspond identically in outline and position of the various details, since the two views were taken by lenses which viewed the same objects from slightly different positions. The views may be laterally offset to a slight extent, as indicated in the drawing, but should coincide as closely as possible in vertical alignment.

If these views are observed through a spectacle having one blue lens and one red lens, the resulting impression will be of a picture in three dimensions. While I have referred to red and blue as the colors of which the pictures are formed, it will be understood that the pictures may be formed of other contrasting colors and that red and blue have been selected for illustration only.

I have illustrated in Fig. 2 a preferred method of making these pictures according to my invention. In this figure, 10 represents a glossy sheet of paper upon which the view 12 has been printed in red ink. The view 14 is next printed in varnish or white ink or other relatively colorless substance which dries with a rough surface. At this stage of the process the second view is substantially invisible and can only be detected by a minute inspection of the paper in a strong light.

The paper 10 with the red ink view 12 and colorless view 14 printed thereon will be sold or otherwise distributed as an article of commerce in this condition and the child to whom this article is sold or given will have the pleasure of completing the process and picture by coloring the second view 14. He accomplishes this by rubbing a blue crayon, blue chalk or similar blue colored material over the roughened surface of the view 14. The high spots of the roughened surface of this view retain the particles 16' of the colored crayon or chalk and give color to the second view. The glossy surface of the paper 10 does not retain the crayon or chalk so that only the roughened surface of the view 14 is colored by this operation.

The resulting two color picture produced by the child can now be viewed through spectacles having one blue and one red lens and will give the desired impression of a picture with three dimensions. In the operation of applying the crayon or chalk to the article, the child has the pleasure of seeing the colored view which he is producing develop as he continues to apply the crayon or chalk and he derives pleasure from watching the development of this view as well as from feeling that he is participating in the completion of the desired result.

Fig. 3 illustrates a modification of my invention in which the views are printed on a paper whose surface is rough enough to retain particles of crayon or chalk rubbed thereover. In this embodiment of my invention the view 12' is printed in red ink on the paper 10' and a coating 18 of smooth drying varnish or other suitable material is then applied over the entire surface of the paper 10'. The second view 14' is then printed in rough drying varnish, white ink or other suitable material on the varnish layer 18 and the resulting article of commerce is now ready for sale or distribution. When the child rubs the crayon or colored chalk over the printed surface of the paper 10', only the rough surface of the varnish coat 14' retains particles 16'' of the crayon or chalk and is colored thereby. From the foregoing, it will be apparent that the only difference between the method illustrated in Fig. 3 and that illustrated in Fig. 2 lies in the type of paper used and the means whereby its surface is rendered incapable of retaining particles of the colored crayon or chalk.

It is to be understood that my invention is not limited to the particular method and means illustrated and described herein, but embraces all other variations and modifications coming within the scope of the appended claims.

I claim:

1. That process of making a stereoscopic picture which comprises printing a first view in colored ink on a sheet of paper, superimposing a second view of the same subject in substantially transparent, colorless material, said views being stereoscopically related to each other, and rubbing said second view with a crayon of stereoscopically contrasting color.

2. That method of producing a stereoscopic picture which comprises printing in colored ink on a sheet of paper a first view of a given subject, superimposing on said first view a second view of said subject in transparent, colorless material having a surface different from the surface of said paper, said views being stereoscopically related to each other, and rubbing said paper and second view with a material having a color stereoscopically contrasting to the color of the first view and which is retained only by the surface of the second view.

3. An article of the class described comprising a sheet of rough paper-like material having color printed thereon a first view of a given subject, a layer of smooth transparent, waterproof varnish overlying said paper and first view, and a second stereoscopically related view of the same subject printed in rough, transparent varnish on said smooth varnish layer and bearing a predetermined relation to said first view whereby a stereoscopic picture is produced by rubbing said article with a crayonlike material having a color stereoscopically related to said first color.

4. That method of producing a two color, three dimensional picture adapted to be viewed through spectacles with lenses of different colors which comprises printing a first view of a given subject in one color, superimposing thereover a second, stereoscopically related view of the same subject in a substantially transparent, colorless material, said material being adapted to acquire a color stereoscopically contrasting to the color of said first view and subsequently treating the second view to give it a color stereoscopically contrasting with the color of said first view.

5. That method of producing a three dimensional picture adapted to be viewed through spectacles with lenses of different colors which comprises printing on a base a first view of a given subject in a colored material, superimposing thereover a second and stereoscopically related view of the same subject in a second material which is substantially colorless and transparent, said materials having different color changing characteristics when exposed to the same treatment, and subsequently subjecting both views to a treatment which converts only said second view to a color complementary to the color of said first view.

6. An article of the class described comprising a sheet of paper-like material having a first view of a given subject printed thereon in colored ink, said paper having a smooth surface and having superimposed on said first view a second view of the same subject printed in substantially transparent colorless rough surface material, said views being stereoscopically related to each other, said article being adapted to be rubbed by a colored crayonlike member whereby only said second view will be colored by said crayon to produce a stereoscopic picture.

7. That method of producing a three dimensional picture adapted to be viewed through spectacles with lenses of different colors which comprises printing a first view of a given subject in a first color, printing a second stereoscopically related view of the same subject in a substantially transparent colorless material over said first view, said material being adapted to acquire a color stereoscopically contrasting with said first color, and giving only to said second view a color stereoscopically contrasting with said first color.

8. That method of producing a stereoscopic picture which comprises forming in colored material on a rough backing a first view of a given subject, applying a layer of smooth transparent waterproof material over said backing and first view, superimposng a second stereoscopically related view of the same subject in transparent colorless material having a rough surface, and rubbing said views with a color stereoscopically contrasting to the color of the first view and which is retained only by the surface of the second view.

JOHN T. ARMBRUST.